US012770379B2

(12) United States Patent
Ito et al.

(10) Patent No.: US 12,770,379 B2
(45) Date of Patent: Oct. 20, 2026

(54) FEATURE OUTPUT MODEL GENERATION SYSTEM, FEATURE OUTPUT MODEL GENERATION METHOD, FEATURE OUTPUT MODEL GENERATION PROGRAM, AND FEATURE OUTPUT MODEL

(71) Applicant: HAMAMATSU PHOTONICS K.K., Hamamatsu (JP)

(72) Inventors: Akari Ito, Hamamatsu (JP); Tomochika Takeshima, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 193 days.

(21) Appl. No.: 18/570,937

(22) PCT Filed: Mar. 10, 2022

(86) PCT No.: PCT/JP2022/010685
§ 371 (c)(1),
(2) Date: Dec. 15, 2023

(87) PCT Pub. No.: WO2023/002678
PCT Pub. Date: Jan. 26, 2023

(65) Prior Publication Data

US 2024/0290080 A1 Aug. 29, 2024

(30) Foreign Application Priority Data

Jul. 19, 2021 (JP) ................................ 2021-118886

(51) Int. Cl.

| | |
|---|---|
| ***G06V 10/00*** | (2022.01) |
| ***G06V 10/75*** | (2022.01) |
| ***G06V 10/778*** | (2022.01) |

(52) U.S. Cl.
CPC .......... *G06V 10/778* (2022.01); *G06V 10/751* (2022.01)

(58) Field of Classification Search
CPC .... G06V 10/82; G06V 10/761; G06V 10/762; G06V 10/764; G06V 10/765;
(Continued)

(56) References Cited

U.S. PATENT DOCUMENTS

| | | | |
|---|---|---|---|
| 4,277,127 | A | 7/1981 | Smith et al. |
| 6,034,780 | A | 3/2000 | Kato |

(Continued)

FOREIGN PATENT DOCUMENTS

| | | | |
|---|---|---|---|
| CN | 1781049 | A | 5/2006 |
| CN | 102803895 | A | 11/2012 |

(Continued)

OTHER PUBLICATIONS

Kato et al., "EP 2889619 A1 Image Processing Device, Program, Image Processing Method, Computer-Readable Medium, and Image Processing System". Date published Jul. 1, 2015.*

(Continued)

*Primary Examiner* — Amir Alavi
(74) *Attorney, Agent, or Firm* — Faegre Drinker Biddle & Reath LLP

(57) ABSTRACT

A feature quantity output model generation system is a system for generating a feature quantity output model to which information based on an image is input and which outputs a feature quantity of the image, and includes: a learning image acquisition unit that acquires a plurality of learning images associated with focal position information related to a focal position at the time of imaging; and a feature quantity output model generation unit that generates a feature quantity output model by machine learning from the acquired learning images, wherein the feature quantity (Continued)

output model generation unit compares the feature quantities of two different learning images according to focal position information associated with the two different learning images and performs machine learning based on the comparison result.

12 Claims, 11 Drawing Sheets

(58) Field of Classification Search
CPC ............. G06V 10/7715; G06V 10/771; G06V 10/778; G06V 10/774; G06V 10/751; G06N 3/02; G06N 3/08; G06N 3/09; G06N 3/042; G06N 3/045; G06N 3/082; G06N 3/092; G06N 3/0464; G06N 20/00; G06N 20/10; G06N 20/20; G03B 15/00; H04N 23/67; H04N 23/675; H04N 23/60; G06T 7/00; G06T 2207/20081; G06T 2207/20084; G06T 2207/10056; G06T 2207/30148
See application file for complete search history.

(56) References Cited

U.S. PATENT DOCUMENTS

| | | | |
|---|---|---|---|
| 6,959,107 | B2 | 10/2005 | Kasai |
| 10,043,285 | B2 * | 8/2018 | Kim ........................ G06T 7/529 |
| 11,361,547 | B2 * | 6/2022 | Aoki ......................... G06T 7/70 |
| 11,978,211 | B2 * | 5/2024 | Takahashi ............ G06V 10/454 |
| 12,159,448 | B2 * | 12/2024 | Akahori ............. G06V 10/7747 |
| 12,190,237 | B2 * | 1/2025 | Nakamura ........... G06V 10/774 |
| 12,217,387 | B2 * | 2/2025 | Kudo ....................... A61B 6/03 |
| 12,243,351 | B2 * | 3/2025 | Takeuchi ............. G06V 40/193 |
| 2010/0177187 | A1 | 7/2010 | Hedlund et al. |
| 2012/0002275 | A1 | 1/2012 | Hayashi et al. |
| 2014/0320731 | A1 | 10/2014 | Zhou |
| 2014/0368716 | A1 | 12/2014 | Maruyama et al. |
| 2019/0005338 | A1 | 1/2019 | Watanabe |
| 2019/0197359 | A1 | 6/2019 | Haneda et al. |
| 2019/0333204 | A1 | 10/2019 | Uchida |
| 2020/0404186 | A1 | 12/2020 | Wakui |
| 2021/0405339 | A1 | 12/2021 | Dastidar |
| 2022/0108128 | A1 | 4/2022 | Lavert et al. |
| 2022/0383525 | A1 | 12/2022 | Sabato et al. |
| 2023/0314909 | A1 | 10/2023 | DiMeo et al. |
| 2023/0379579 | A1 | 11/2023 | Feng et al. |
| 2024/0147065 | A1 | 5/2024 | Choi et al. |

FOREIGN PATENT DOCUMENTS

| | | | |
|---|---|---|---|
| CN | 108124096 | A | 6/2018 |
| CN | 109916341 | A | 6/2019 |
| CN | 109981976 | A | 7/2019 |
| CN | 110168609 | A | 8/2019 |
| CN | 111844014 | A | 10/2020 |
| CN | 111902770 | A | 11/2020 |
| CN | 112598045 | A | 4/2021 |
| JP | H9-311102 | A | 12/1997 |
| JP | H11-328408 | A | 11/1999 |
| JP | 2010-011042 | A | 1/2010 |
| JP | 2010-243212 | A | 10/2010 |
| JP | 2012-008450 | A | 1/2012 |
| JP | 2012-068188 | A | 4/2012 |
| JP | 2013-050713 | A | 3/2013 |
| JP | 2014182248 | A | 9/2014 |
| JP | 2015-152880 | A | 8/2015 |
| JP | 6038422 | B1 | 12/2016 |
| JP | 2017092753 | A | 5/2017 |
| JP | 2018-132475 | A | 8/2018 |
| JP | 2020-060602 | A | 4/2020 |
| JP | 2020-148856 | A | 9/2020 |
| JP | 2020-160966 | A | 10/2020 |
| JP | 2020-160996 | A | 10/2020 |
| JP | 2021-021637 | A | 2/2021 |
| JP | 2021-056678 | A | 4/2021 |
| JP | 2021-085757 | A | 6/2021 |
| JP | 2021-140032 | A | 9/2021 |
| TW | 201707436 | A | 2/2017 |
| TW | 201831881 | A | 9/2018 |
| WO | 2004/097493 | A1 | 11/2004 |
| WO | WO-2007/139201 | A1 | 12/2007 |
| WO | WO-2015/107927 | A1 | 7/2015 |
| WO | WO-2017/154895 | A1 | 9/2017 |
| WO | WO-2019/181053 | A1 | 9/2019 |
| WO | WO-2020/071499 | A1 | 4/2020 |
| WO | WO-2020/104521 | A2 | 5/2020 |

OTHER PUBLICATIONS

Hao et al., “CN 102214705 A AlGaN Polarized Ultraviolet Photoelectric Detector and Its Manufacturing Method.”. Date published Oct. 12, 2011.*

Watanabe, “JP 2020175425 A Mechanical Learning Device for Learning Focus Positional Deviation of Laser Beam Machine and Mechanical Learning Method, and Laser Processing System for Correcting Focus Positional Deviation”. Date published Oct. 29, 2020.*

Henry Pinkard et al, “Deep learing for single-shot autofocus microscopy”, Optica. vol. 6, No. 20. Optica., Jun. 20, 2019, p. 1-p. 8.

Extended European Search Report issued on Apr. 11, 2025 in corresponding European patent application 22845617.4.

Extended European Search Report issued on Mar. 26, 2025 in corresponding European patent application 22845618.2.

Pinkard Henry et al., “Deep learning for single-shot autofocus microscopy”, Optica, [Online] H04N23/60 vol. 6, No. 6URL:https://www.osapublishing.org/viewmedi G06V10/774a.cfm?URI=optica-6-6-794>, Jun. 20, 2019, p. 794-p. 797, XP093171748.

Office Action issued Nov. 5, 2025 in related U.S. Appl. No. 18/570,881.

International Preliminary Report on Patentability mailed Feb. 1, 2024 for PCT/JP2022/010674.

International Preliminary Report on Patentability mailed Feb. 1, 2024 for PCT/JP2022/010685.

International Preliminary Report on Patentability mailed Feb. 1, 2024 for PCT/JP2022/010693.

Tan Di1,2, Zhang Xin1, Wu Yanxiong1, Liu Tao1, “Analysis of effect of optical aberration on star centroid location error”, 1. Key Laboratory of Optical System Advanced Manufacturing Technology, Changchun Institute of Optics, Fine Mechanics and Physics, Chinese Academy of Sciences, Changchun 130033, China; 2?University of Chinese Academy of Sciences, Beijing 100049, China, Feb. 25, 2017 vol. 46 No. 2.

Yan Yousandeng;, “Deep Learning: Core Algorithms and Practical Case Studies for Face Image Processing”, China Machine Press (Mechanical Industry Press), Aug. 31, 2020, p. 178.

ZHAOAi-gang1.2, Wang Hong-li1, YANGXiao-gang, LUJing-hui1, JIANGWei1, HUANGPeng-j, “Infrared small-target detection algorithm based on background prediction by extreme learning machine”, 1. Departmento fC ontrol and Engineering, The Second Artillery EngineeringU niversity, Xi’an 710025, China; 2. School ofSergeancy, The Second Artillery Engineering University, Qingzhou 262500, China, Feb. 15, 2016.

Henry Pinkard, “Deep learning for single-shot autofocus microscopy”, Optical Society of America, 2019, p. 1-p. 7.

* cited by examiner (a)

(b)

(a)

(b)

FEATURE OUTPUT MODEL GENERATION SYSTEM, FEATURE OUTPUT MODEL GENERATION METHOD, FEATURE OUTPUT MODEL GENERATION PROGRAM, AND FEATURE OUTPUT MODEL

TECHNICAL FIELD

The present invention relates to a feature quantity output model generation system, a feature quantity output model generation method, and a feature quantity output model generation program for generating a feature quantity output model, which receives information based on an image as its input and outputs a feature quantity of the image, and the feature quantity output model.

BACKGROUND ART

Conventionally, a virtual slide scanner has been used that uses an image obtained by imaging (scanning) a slide glass as a virtual microscope image. In such a device, it is necessary to perform imaging with the focal position on the sample. In response to this, it has been proposed to estimate an appropriate focal position based on an image obtained by imaging the sample. For example, Patent Literature 1 describes estimation using a machine learning algorithm.

CITATION LIST

Patent Literature

Patent Literature 1: Japanese Unexamined Patent Publication No. 2013-50713

SUMMARY OF INVENTION

Technical Problem

However, when generating a learned model for estimating an appropriate focal position, it takes a long time to perform machine learning simply by using images and information indicating the appropriate focal position as training data. For this reason, it is difficult to estimate an appropriate focal position by short-time learning, and estimation based on short-time learning has been demanded.

An embodiment of the present invention has been made in view of the above, and it is an object of the present invention to provide a feature quantity output model generation system, a feature quantity output model generation method, and a feature quantity output model generation program capable of generating a learned model used for image-based estimation, such as focal position estimation, by short-time learning and the feature quantity output model.

Solution to Problem

In order to achieve the aforementioned object, a feature quantity output model generation system according to an embodiment of the present invention is a feature quantity output model generation system for generating a feature quantity output model to which information based on an image is input and which outputs a feature quantity of the image, and includes: a learning image acquisition means for acquiring a plurality of learning images associated with focal position information related to a focal position at the time of imaging; and a feature quantity output model generation means for generating a feature quantity output model by machine learning from the learning images acquired by the learning image acquisition means. The feature quantity output model generation means compares feature quantities of two different learning images according to focal position information associated with the two different learning images and performs machine learning based on a result of the comparison.

In the feature quantity output model generation system according to the embodiment of the present invention, the feature quantity output model for outputting the feature quantity of the image is generated by machine learning. At this time, the feature quantities of the two different learning images are compared with each other according to the focal position information associated with the two different learning images, and machine learning is performed based on the comparison result. According to this generation, it is possible to generate a feature quantity output model in a short time by using, for example, an existing learned model to which image-based information is input. That is, according to the feature quantity output model generation system according to the embodiment of the present invention, it is possible to generate a learned model used for image-based estimation, such as focal position estimation, by short-time learning.

The feature quantity output model generation means may perform machine learning so that a difference between feature quantities of two different learning images becomes smaller when the two different learning images have the same focal position and the difference between the feature quantities of the two different learning images becomes larger when the two different learning images have different focal positions. According to this configuration, it is possible to reliably and appropriately generate a feature quantity output model.

The learning image acquisition means may acquire, as a learning image, an image obtained by detecting radiation from an imaging target, an image obtained by detecting light from the imaging target when the imaging target is irradiated with light, or an image obtained by detecting electrical characteristics of the imaging target when the imaging target is irradiated with light. In addition, the learning image acquisition means may acquire, as a learning image, an image obtained by irradiating the imaging target with light having a specific wavelength. According to these configurations, it is possible to generate an appropriate feature quantity output model according to the type of image used.

The learning image acquisition means may acquire in-focus position information related to a focal position when in focus corresponding to each learning image to be acquired. The feature quantity output model generation system may further include a focal position estimation model generation means for generating a focal position estimation model to which a feature quantity output from the feature quantity output model, which is generated by the feature quantity output model generation means, is input, and which estimates a focal position when in focus corresponding to an image related to the feature quantity, by machine learning from the in-focus position information acquired by the learning image acquisition means. According to this configuration, it is possible to generate a focal position estimation model for estimating the focal position when in focus from the image. That is, according to this configuration, it is possible to generate a learned model used for estimating the focal position based on the image by short-time learning, together with the feature quantity output model.

Incidentally, an embodiment of the present invention can be described not only as the invention of the feature quantity output model generation system as described above but also as inventions of a feature quantity output model generation method and a feature quantity output model generation program as follows. These differ only in category, but are substantially the same invention and have similar functions and effects.

That is, a feature quantity output model generation method according to an embodiment of the present invention is a feature quantity output model generation method for generating a feature quantity output model to which information based on an image is input and which outputs a feature quantity of the image, and includes: a learning image acquisition step for acquiring a plurality of learning images associated with focal position information related to a focal position at the time of imaging; and a feature quantity output model generation step for generating a feature quantity output model by machine learning from the learning images acquired in the learning image acquisition step. In the feature quantity output model generation step, feature quantities of two different learning images are compared with each other according to focal position information associated with the two different learning images, and machine learning is performed based on a result of the comparison.

In the feature quantity output model generation step, machine learning may be performed so that a difference between feature quantities of two different learning images becomes smaller when the two different learning images have the same focal position and the difference between the feature quantities of the two different learning images becomes larger when the two different learning images have different focal positions.

In the learning image acquisition step, an image obtained by detecting radiation from an imaging target, an image obtained by detecting light from the imaging target when the imaging target is irradiated with light, or an image obtained by detecting electrical characteristics of the imaging target when the imaging target is irradiated with light may be acquired as a learning image. In the learning image acquisition step, an image obtained by irradiating the imaging target with light having a specific wavelength may be acquired as a learning image.

In the learning image acquisition step, in-focus position information related to a focal position when in focus corresponding to each learning image to be acquired may be acquired. The feature quantity output model generation method may further include a focal position estimation model generation step for generating a focal position estimation model to which a feature quantity output from the feature quantity output model, which is generated in the feature quantity output model generation step, is input, and which estimates a focal position when in focus corresponding to an image related to the feature quantity, by machine learning from the in-focus position information acquired in the learning image acquisition step.

In addition, a feature quantity output model generation program according to an embodiment of the present invention is a feature quantity output model generation program causing a computer to operate as a feature quantity output model generation system for generating a feature quantity output model to which information based on an image is input and which outputs a feature quantity of the image. The feature quantity output model generation program causes the computer to function as: a learning image acquisition means for acquiring a plurality of learning images associated with focal position information related to a focal position at the time of imaging; and a feature quantity output model generation means for generating a feature quantity output model by machine learning from the learning images acquired by the learning image acquisition means. The feature quantity output model generation means compares feature quantities of two different learning images according to focal position information associated with the two different learning images and performs machine learning based on a result of the comparison.

The feature quantity output model generation means may perform machine learning so that a difference between feature quantities of two different learning images becomes smaller when the two different learning images have the same focal position and the difference between the feature quantities of the two different learning images becomes larger when the two different learning images have different focal positions.

The learning image acquisition means may acquire, as a learning image, an image obtained by detecting radiation from an imaging target, an image obtained by detecting light from the imaging target when the imaging target is irradiated with light, or an image obtained by detecting electrical characteristics of the imaging target when the imaging target is irradiated with light. The learning image acquisition means may acquire, as a learning image, an image obtained by irradiating the imaging target with light having a specific wavelength.

The learning image acquisition means may acquire in-focus position information related to a focal position when in focus corresponding to each learning image to be acquired. The feature quantity output model generation program may cause the computer to further function as a focal position estimation model generation means for generating a focal position estimation model to which a feature quantity output from the feature quantity output model, which is generated by the feature quantity output model generation means, is input, and which estimates a focal position when in focus corresponding to an image related to the feature quantity, by machine learning from the in-focus position information acquired by the learning image acquisition means.

In addition, the feature quantity output model itself generated by the feature quantity output model generation system according to the embodiment of the present invention is also an invention having a novel configuration. That is, a feature quantity output model according to an embodiment of the present invention is a feature quantity output model for making a computer function to receive information based on an image and output a feature quantity of the image. The feature quantity output model is generated by machine learning from a plurality of learning images associated with focal position information related to a focal position at the time of imaging. Feature quantities of two different learning images are compared with each other according to focal position information associated with the two different learning images, and machine learning is performed based on a result of the comparison.

The feature quantity output model may be generated by performing machine learning so that a difference between feature quantities of two different learning images becomes smaller when the two different learning images have the same focal position and the difference between the feature quantities of the two different learning images becomes larger when the two different learning images have different focal positions.

The feature quantity output model may be generated by performing machine learning using, as a learning image, an image obtained by detecting radiation from an imaging target, an image obtained by detecting light from the imaging target when the imaging target is irradiated with light, or an image obtained by detecting electrical characteristics of the imaging target when the imaging target is irradiated with light. The feature quantity output model is generated by performing machine learning using, as a learning image, an image obtained by irradiating the imaging target with light having a specific wavelength.

Advantageous Effects of Invention

According to an embodiment of the present invention, it is possible to generate a learned model used for image-based estimation, such as focal position estimation, by short-time learning.

DESCRIPTION OF EMBODIMENTS

Figure 1:
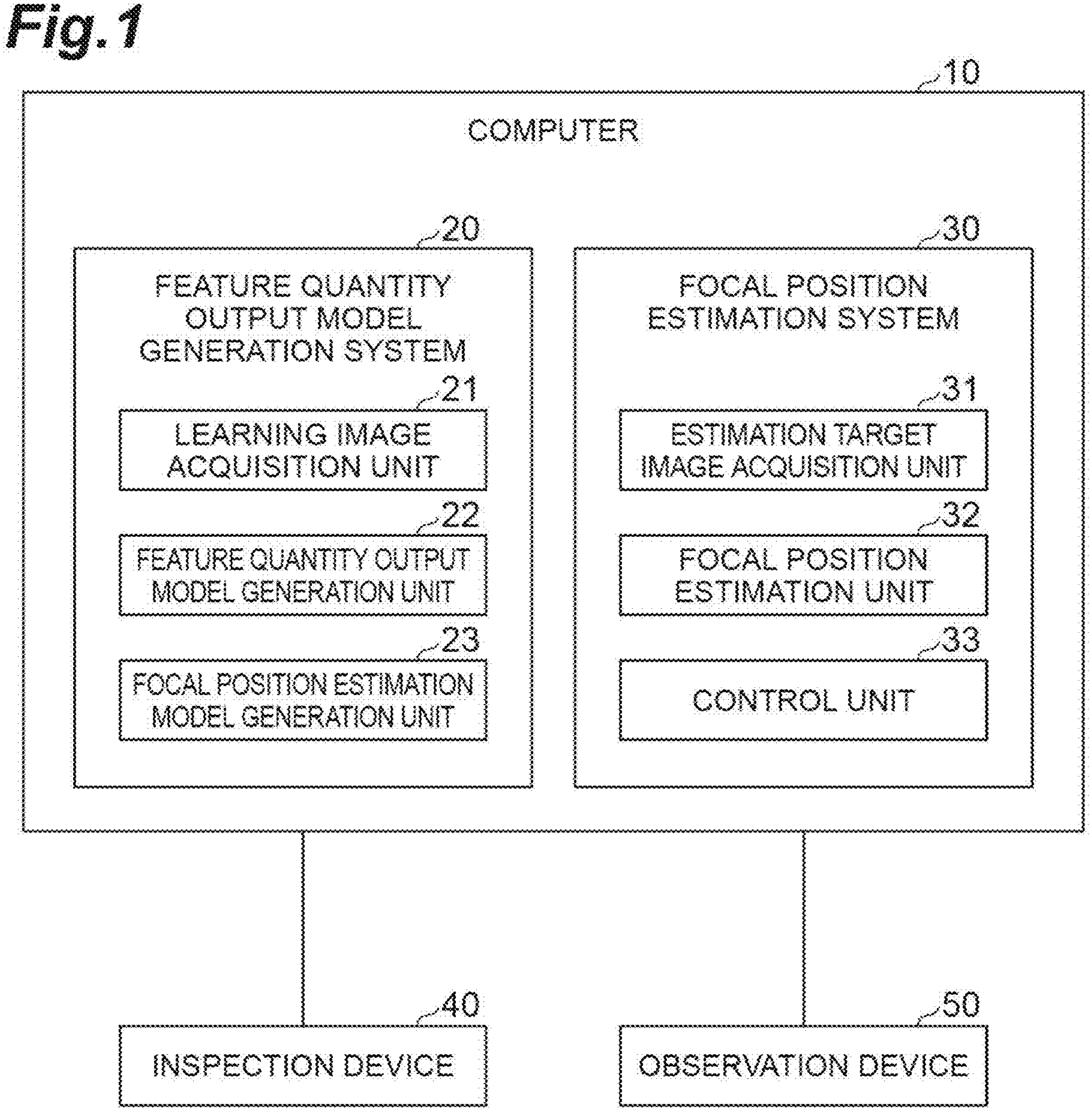
FIG. 1 is a diagram showing the configurations of a feature quantity output model generation system and a focal position estimation system according to an embodiment of the present invention.

Hereinafter, embodiments of a feature quantity output model generation system, a feature quantity output model generation method, a feature quantity output model generation program, and a feature quantity output model according to the present invention will be described in detail with reference to the diagrams. In addition, in the description of the diagrams, the same elements are denoted by the same reference numerals, and repeated description thereof will be omitted.

FIG. 1 shows a computer 10, which is a feature quantity output model generation system according to the present embodiment. The computer 10 is a device (system) that performs information processing on an image. Specifically, the computer 10 performs information processing on an image captured by at least one of an inspection device 40 and an observation device 50. In addition, the computer 10 may perform information processing on an image captured by a device other than the inspection device 40 and the observation device 50. That is, the computer 10 may be applied to a device that performs imaging other than the inspection device 40 and the observation device 50.

The inspection device 40 is a device that captures an image of a semiconductor device and inspects the semiconductor device based on the captured image. For example, the inspection device 40 performs failure analysis of a semiconductor device. The semiconductor device to be inspected is, for example, a wafer covered with μLEDs (Light Emitting Diodes). Failure analysis is performed, for example, by emission analysis, heat generation analysis, analysis using pattern images, or analysis using laser (OBIRCH, OBIC, DALS, or the like). The inspection device 40 may be a conventional inspection device. All of the components described below may be included in the conventional inspection device.

Figure 2:
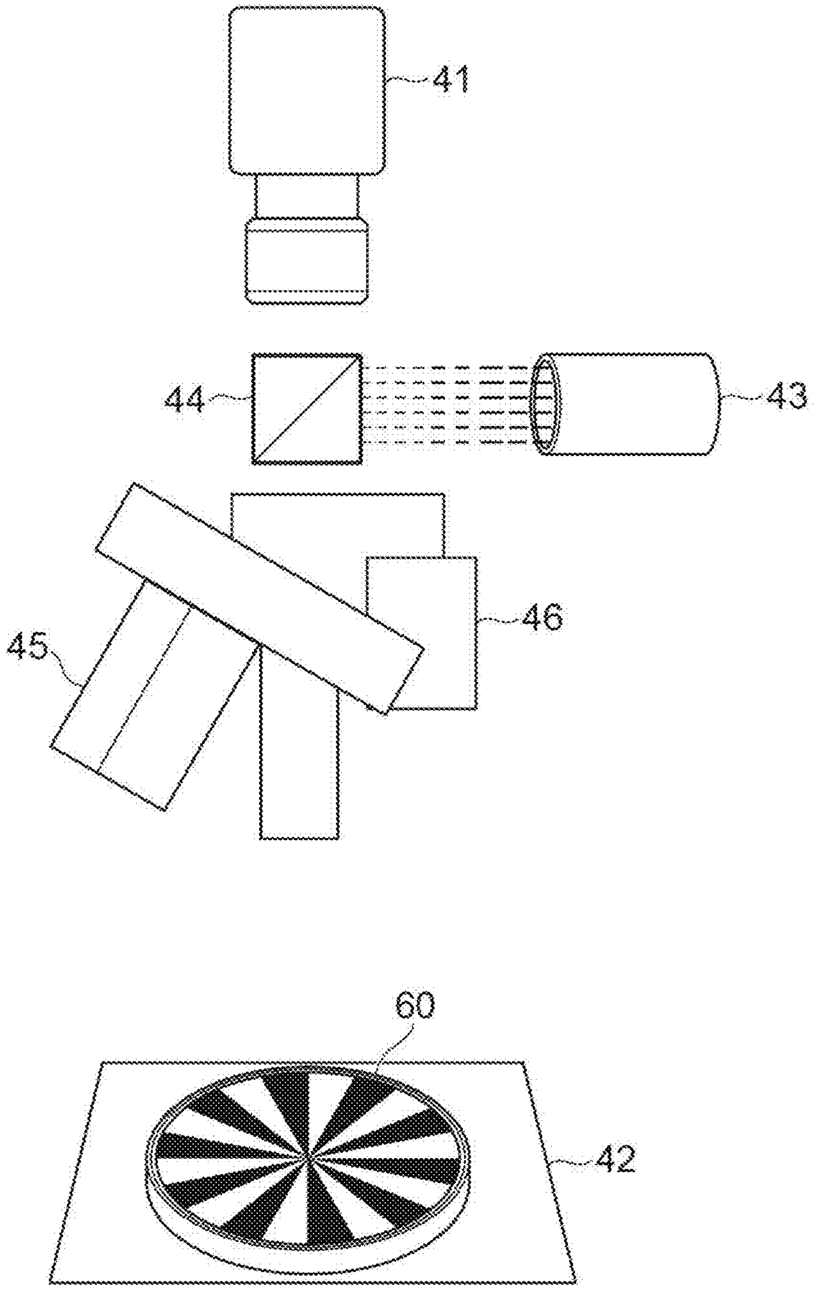
FIG. 2 is a diagram showing an example of the configuration of a part of an inspection device.

For example, FIG. 2 shows the configuration of a part of the inspection device 40 that performs emission analysis. As shown in FIG. 2, the inspection device 40 includes a camera 41, a mounting unit 42, a light source 43, an optical system 44, an objective lens 45, and a stage 46. The camera 41 is an imaging device that images a semiconductor device that is an imaging target. The camera 41 is, for example, an InGaAs camera. The mounting unit 42 is a component on which a semiconductor device that is an imaging target is mounted. In FIG. 2, a standard sample 60 mounted on the mounting unit 42 is not an inspection target, but corresponds to an image corresponding to the focal position described later. The standard sample 60 is a sample with an artificial pattern (for example, a radial striped pattern shown in FIG. 2).

The light source 43 is a device that outputs irradiation light with which the imaging target is irradiated. The light source 43 may output irradiation light having a specific wavelength (for example, a standard wavelength of 1100 nm and wavelengths of 900 nm and 1300 nm different from the standard wavelength). In addition, the wavelength of the irradiation light may be switched, for example, by preparing a plurality of light sources 43. The optical system 44 is an optical system for irradiating the semiconductor device which is an imaging target with the irradiation light output from the light source 43. The objective lens 45 is an objective lens used for imaging by the camera 41, and is, for example, a solid immersion lens (SIL). The stage 46 is a member for adjusting the focal position when the camera 41 captures an image. The stage 46 may be one that can move not only in the imaging direction (focal position direction, Z-axis direction) but also in any three-dimensional direction (that is, an XYZ stage). The focal position of the inspection device 40 during imaging is controlled by the computer 10 as will be described later. The inspection device 40 includes an inspection unit for inspecting a semiconductor device by using an image obtained by the configuration described above.

In addition, the configuration of the inspection device 40 does not have to be the one described above, and a different configuration may be used depending on the analysis method. For example, in heat analysis, no lighting (light source 43) is required. Therefore, an InSb camera may be used as an imaging device (camera 41). In addition, when performing analysis using a pattern image, an incoherent light source or a coherent light source may be used as a lighting (light source 43), and a two-dimensional detector or an optical scanning device and a photodiode may be used as an imaging device. When performing laser analysis, an incoherent light source or a coherent light source may be used as a lighting (light source 43), and an electrical characteristic acquisition device for semiconductor devices may be used as an imaging device.

The observation device 50 is a device that captures an image of a biological sample mounted on a slide glass and observes the captured image of the biological sample. The observation device 50 may be a conventional observation device. For example, the observation device 50 is the conventional virtual slide scanner described above. The observation device 50 includes an imaging device for imaging a biological sample that is an imaging target, a mounting unit on which the biological sample that is an imaging target is mounted, and an observation unit for observing the biological sample based on the captured image. The focal position of the observation device 50 during imaging is controlled by the computer 10 as will be described later.

Figure 3:
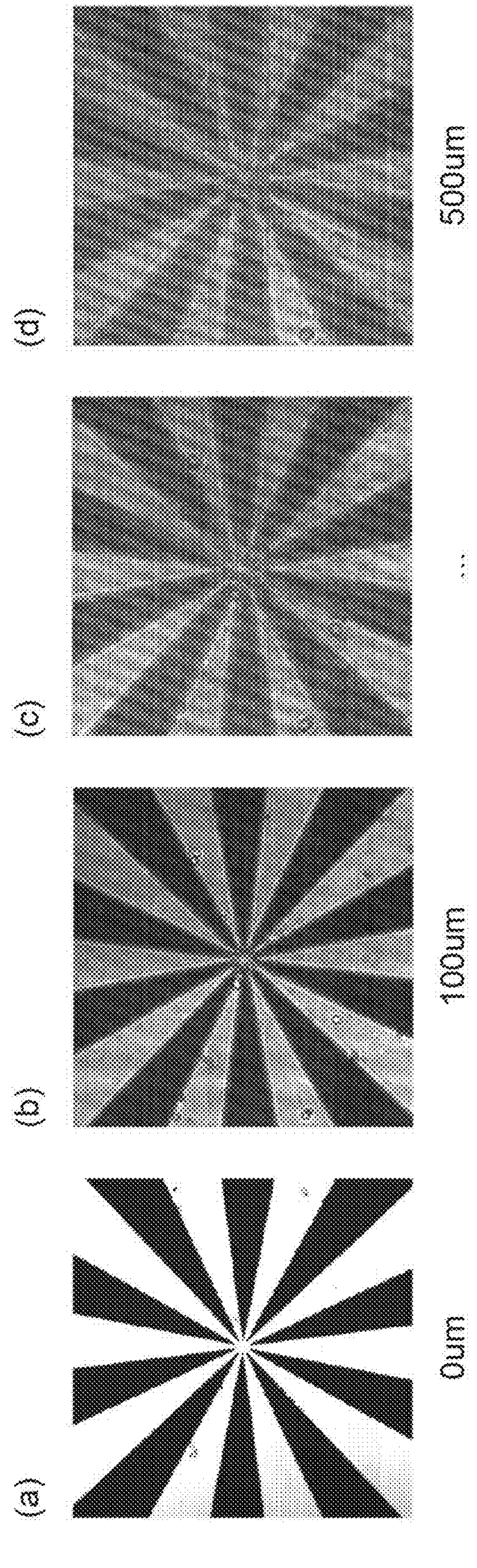
FIG. 3 is an example of an image captured at each focal position.

Imaging by the inspection device 40 and the observation device 50 needs to be performed with the imaging target in focus. This is for appropriately inspecting or observing the imaging target. FIG. 3 shows examples of a captured image corresponding to the focal position. These images are obtained by imaging the standard sample 60 shown in FIG. 2. FIG. 3(*a*) is an image captured at the focal position when in focus. FIG. 3(*b*) is an image when the focal position is 100 μm away from the focal position when in focus. FIG. 3(*c*) is an image when the focal position is further away than in the case of FIG. 3(*b*). FIG. 3(*d*) is an image when the focal position is further away than in the case of FIG. 3(*c*) and the focal position is 500 μm away from the focal position when in focus. That is, FIG. 3(*a*) is an example of a focused image, and FIGS. 3(*b*) to 3(*d*) are examples of a defocused image.

The computer 10 performs information processing so that imaging by the inspection device 40 and the observation device 50 is performed in a state in which the imaging target is in focus. As a functional configuration, the computer 10 includes a feature quantity output model generation system 20 that generates a learned model by machine learning and a focal position estimation system 30 that performs information processing for enabling the above imaging by using the learned model generated by the feature quantity output model generation system 20. The feature quantity output model generation system 20 is a system (device) that generates a feature quantity output model that receives information based on an image as its input and outputs the feature quantity of the image, as will be described in detail later. The focal position estimation system 30 is a system (device) that estimates a focal position when in focus corresponding to an estimation target image, as will be described in detail later. In addition, in the present embodiment, the inspection device 40 and the observation device 50 are shown as devices that perform imaging. However, devices (systems) other than the above may be used as long as these perform imaging with the imaging target in focus.

The computer 10 is, for example, a conventional computer including hardware, such as a CPU (Central Processing Unit), a memory, and a communication module. In addition, the computer 10 may be a computer system including a plurality of computers. In addition, the computer 10 may be configured by cloud computing. Each function of the computer 10, which will be described later, is realized by the operations of these components by a program or the like. The computer 10, the inspection device 40, and the observation device 50 are connected to each other so that information can be transmitted and received therebetween.

Next, functions of the feature quantity output model generation system 20 and the focal position estimation system 30 included in the computer 10 according to the present embodiment will be described. As shown in FIG. 1, the feature quantity output model generation system 20 includes a learning image acquisition unit 21, a feature quantity output model generation unit 22, and a focal position estimation model generation unit 23.

Before describing each function of the feature quantity output model generation system 20, a learned model generated by the feature quantity output model generation system 20 will be described. The learned models generated by the feature quantity output model generation system 20 are two of a feature quantity output model and a focal position estimation model.

The feature quantity output model is a model that receives information based on an image as its input and outputs the feature quantity of the image. Images used for an input to the feature quantity output model are images captured by the inspection device 40 and the observation device 50 or partial images thereof. The feature quantity, which is an output from the feature quantity output model, is information indicating the features of the image related to the input. In the present embodiment, the feature reflects a focal position when the image is captured. That is, the feature quantity output model is an optical model related to optical features. The feature quantity is, for example, a vector with the number of dimensions set in advance (for example, 1024 dimensions). The feature quantity is used as an input to the focal position estimation model as described later.

The feature quantity output model includes, for example, a neural network. The neural network may be a multilayer neural network. That is, the feature quantity output model may be generated by deep learning. In addition, the neural network may be a convolutional neural network (CNN).

Neurons for inputting image-based information to the input layer are provided in the feature quantity output model. For example, the information input to the feature quantity output model is the pixel value of each pixel in the image. In this case, as many neurons as the number of pixels in the image are provided in the input layer, and the pixel value of the corresponding pixel is input to each neuron. As will be described later, an image related to information input to the feature quantity output model is an image having a size set in advance (for example, an image having 224×224 pixels).

In addition, information input to the feature quantity output model may be other than the pixel value of each pixel as long as the information is based on the image. For example, the information may be a feature quantity to be input to the feature quantity output model, which is obtained by performing preprocessing, such as conventional image processing, on an image in order to reduce the influence of the imaging environment. By performing such preprocessing, it is possible to improve the efficiency of machine learning and the accuracy of the generated feature quantity output model.

Neurons for outputting feature quantities to the output layer are provided in the feature quantity output model. For example, as many neurons as the number of dimensions of the vector of feature quantities are provided.

The focal position estimation model is a model that receives a feature quantity output from the feature quantity output model as its input and estimates a focal position when in focus corresponding to the image related to the feature quantity. The focal position estimation model outputs, for example, information indicating the difference between the focal position when the image related to the input feature quantity is captured and the focal position when in focus as the estimation result of the focal position when in focus. The difference is, for example, a value obtained by subtracting the focal length corresponding to the focal position when the image related to the feature quantity is captured from the focal length corresponding to the focal position when in focus. That is, in this case, a value indicating the focal position when an image is captured in a coordinate system in which the position of the focal position when in focus is 0 is the output value. The focal position when in focus is a focal position for capturing an image by focusing on the imaging target captured in the image related to the input feature quantity. A focused image can be captured by changing the focal position by the above difference from the focal position when a defocused image related to the input feature quantity is captured.

In this case, candidates for the above difference may be set in advance, and the focal position estimation model may output a value indicating the degree of validity for each of the candidates. For example, +50 μm, 0 μm, −50 μm, −100 μm, . . . are set as candidates for the difference, and the focal position estimation model outputs a value indicating the degree of validity for each of the candidates. For example, a candidate for which the value is the highest is set as the above difference. Alternatively, the focal position estimation model may output the value itself of the above difference.

Alternatively, the focal position estimation model may output information indicating the focal position itself when in focus (for example, a focal length corresponding to the focal position when in focus). In this case, candidates for the focal position itself when in focus may be set in advance, and the focal position estimation model may output a value indicating the degree of validity for each of the candidates. Alternatively, the focal position estimation model may output the value itself of the focal position when in focus.

The focal position estimation model includes, for example, a neural network. The neural network may be a multilayer neural network. That is, the focal position estimation model may be generated by deep learning. In addition, the neural network may be a convolutional neural network (CNN).

Neurons for inputting feature quantities to the input layer are provided in the focal position estimation model. For example, neurons corresponding to the neurons provided in the output layer of the feature quantity output model are provided in the input layer. That is, as many neurons as the number of neurons provided in the output layer of the feature quantity output model are provided in the input layer. Neurons for outputting the estimation result of the focal position when in focus described above are provided in the focal position estimation model. For example, as many neurons as the number of candidates (when outputting a value for each candidate) or one neuron (when outputting the above difference or the focal position itself when in focus) is provided.

In addition, the feature quantity output model and the focal position estimation model may be configured by those other than the neural network.

The feature quantity output model and the focal position estimation model are assumed to be used as program modules that are parts of artificial intelligence software. For example, the feature quantity output model and the focal position estimation model are used in a computer including a CPU and a memory, and the CPU of the computer operates according to instructions from the models stored in the memory. For example, the CPU of the computer operates to input information to the models, perform calculations according to the models, and output results from the models according to the instructions. Specifically, according to the instructions, the CPU of the computer operates to input information to the input layer of the neural network, perform calculations based on parameters such as weighting coefficients that have been learned in the neural network, and output results from the output layer of the neural network.

The learning image acquisition unit 21 is a learning image acquisition means for acquiring a plurality of learning images associated with focal position information related to the focal position at the time of imaging. The learning image acquisition unit 21 may acquire, as a learning image, an image obtained by detecting radiation from the imaging target, an image obtained by detecting light from the imaging target when the imaging target is irradiated with light, or an image obtained by detecting the electrical characteristics of the imaging target when the imaging target is irradiated with light. The learning image acquisition unit 21 may acquire, as a learning image, an image obtained by irradiating the imaging target with light having a specific wavelength. The learning image acquisition unit 21 acquires in-focus position information related to the focal position when in focus corresponding to each learning image to be acquired.

Figure 4:
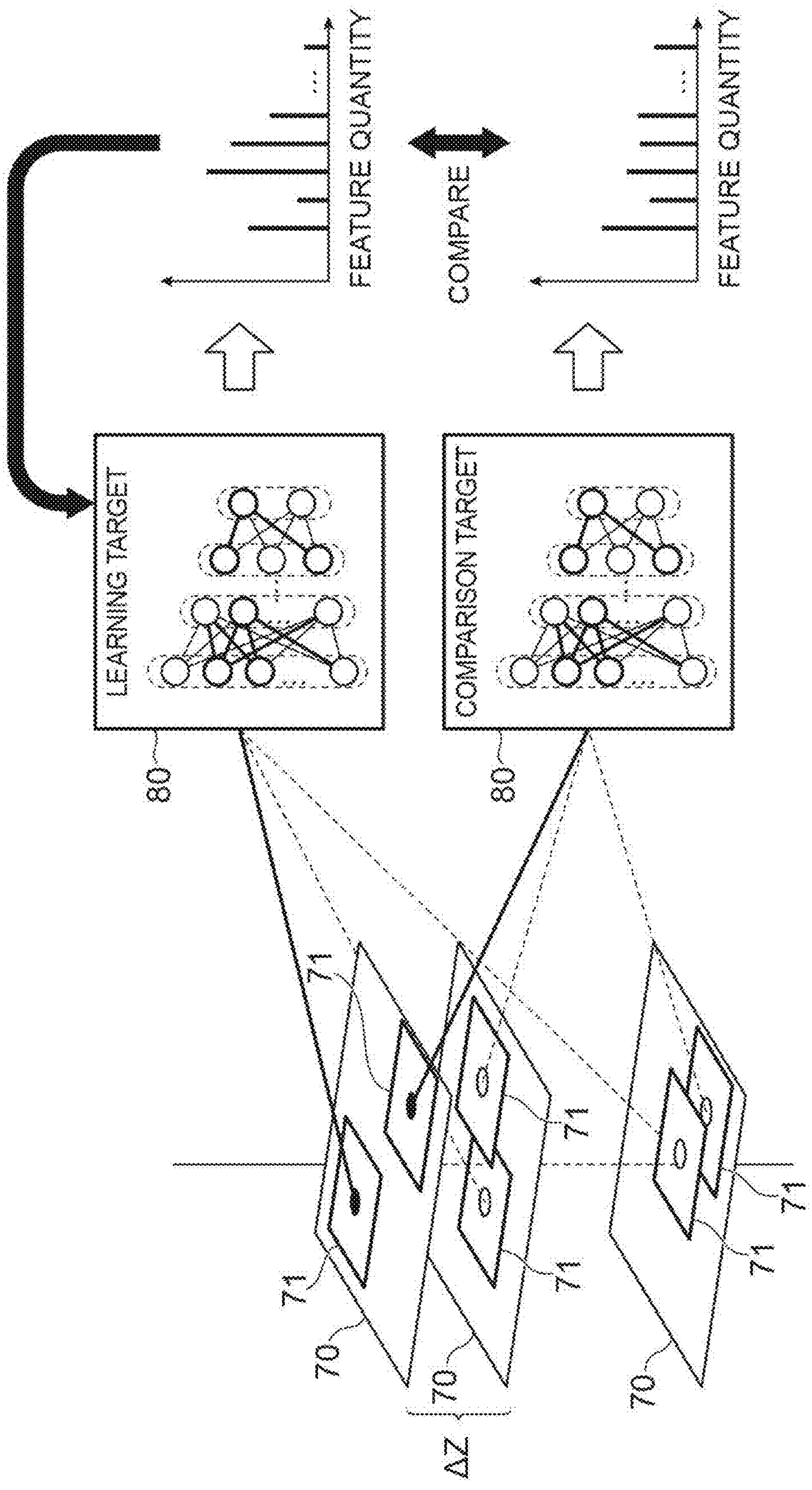
FIG. 4 is a diagram for explaining the generation of a feature quantity output model by machine learning.

For example, the learning image acquisition unit 21 acquires an image captured by the inspection device 40 or the observation device 50. In this image, an imaging target for learning images is captured. The imaging target for learning images may be, for example, the standard sample 60 shown in FIG. 2. Alternatively, the imaging target for learning images may be others (for example, an object to be imaged by the inspection device 40 or the observation device 50). For example, as shown in FIG. 4, the learning image acquisition unit 21 cuts out a partial image from an acquired image 70 to obtain a learning image 71. The learning image 71 is an image used for machine learning to generate the two learned models described above. For this reason, the learning image acquisition unit 21 acquires a plurality of learning images 71 in a number sufficient to appropriately generate the learned models.

In the present embodiment, since the focal position when in focus is estimated from the defocused image, the plurality of learning images 71 are made to include the defocused image. In addition, there may be a plurality of defocused images, and focal positions related thereto may be various positions. That is, focal lengths corresponding to the focal positions related thereto may be various distances. In addition, the plurality of learning images 71 may include a focus image. FIG. 4 shows an example in which the number of acquired images 70 is three. The vertical direction of a portion showing the images 70 in FIG. 4 is an imaging direction (focal position direction, Z-axis direction).

The learning image 71 corresponds to an image used for an input to the feature quantity output model. In this case, instead of the entire image captured by the inspection device 40 or the observation device 50, information based on a partial image of the image having the same size as the learning image 71 is input to the feature quantity output model. Therefore, the learning image acquisition unit 21 cuts out the learning image 71, which is a partial image having a size set in advance and is used for the input of the feature quantity output model, from the acquired image 70. The position where the learning image 71 is cut out in the image 70 is a portion in which the imaging target is captured. However, the learning images 71 may include the learning image 71 in which no imaging target is captured. The position where the learning image 71 is cut out in the image 70 may be set in advance. Alternatively, a position where it is estimated that the imaging target is captured by performing image recognition on the image 70 may be the position where the learning image 71 is cut out.

As shown in FIG. 4, the learning image acquisition unit 21 may cut out a plurality of learning images 71 from one image 70. When a plurality of learning images 71 are cut out from the image 70, the positions of the learning images 71 may overlap each other.

In the inspection device 40 or the observation device 50, imaging is performed to generate an image that is the basis of the learning image 71. At this time, for example, in the inspection device 40 or the observation device 50, a plurality of consecutive imagings with different focal positions are performed by fixing the position (XY) at the time of imaging other than the imaging direction (Z-axis direction). At this time, as shown in FIG. 4, the focal positions are made different at regular intervals (steps) ($\Delta Z$). Imaging for the learning image 71 in the inspection device 40 or the observation device 50 may be performed by a method other than the above.

In addition, the learning image acquisition unit 21 may use the image 70 itself captured by the inspection device 40 or the observation device 50 as a learning image. In this case, it is assumed that the image used for an input to the feature quantity output model also has the size of the image 70. In addition, the learning image acquisition unit 21 may acquire the image 70 from a device other than the inspection device 40 or the observation device 50.

In addition, as described above, the learning image 71 may be an image obtained by detecting radiation from the imaging target (an image used for emission and heat generation analysis), an image obtained by detecting light from the imaging target when the imaging target is irradiated with light (an image used for pattern analysis), or an image obtained by detecting the electrical characteristics of the imaging target when the imaging target is irradiated with light (an image used for laser analysis). In addition, the learning image 71 may be an image obtained by irradiating the imaging target with light having a specific wavelength (for example, light having a specific wavelength used for inspection). These are the types of images normally used by the inspection device 40 or the observation device 50. However, when generating a set of feature quantity output model and focal position estimation model, only one type of image may be used as the learning image 71. In this case, a set of feature quantity output model and focal position estimation model to be generated corresponds to a specific image type.

The wavelength of light used in emission analysis changes depending on the driving voltage and design rules of the inspection device 40. In addition, in the actual optical system, defocus occurs for each wavelength due to adjustment and the characteristics of optical elements. In addition, the detection sensitivity may be maximized at a position different from the focal position for observing the pattern image (image). In consideration of these, a feature quantity output model for each wavelength may be generated by using an image for each specific wavelength as described above. For example, a feature quantity output model for each wavelength may be generated by using images for each of the standard wavelength (1100 nm) and wavelengths (900 nm, 1300 nm) different from the standard wavelength.

In addition, when generating a set of feature quantity output model and focal position estimation model, only images (including partial images) captured by the model (type) of either the inspection device 40 or the observation device 50 may be used as the learning images 71. In this case, a set of feature quantity output model and focal position estimation model to be generated corresponds to a specific model of inspection device 40 or observation device 50. That is, the feature quantity output model and the focal position estimation model reflect the features of the inspection device 40 or the observation device 50. In this manner, by making the learning image correspond to a specific type of image or a specific model of inspection device 40 or observation device 50, a more accurate learned model can be obtained. Alternatively, the focal position estimation model may be common to a plurality of image types or models.

Each learning image 71 is associated with focal position information related to the focal position when capturing the learning image 71. The focal position information is, for example, information indicating the focal position described above. However, the focal position information is information regarding the focal position, and may be any information other than the above as long as the information can be used to generate the learned model described above. The focal position information is obtained, for example, as information when the inspection device 40 or the observation device 50 captures an image. For example, the learning image acquisition unit 21 receives and acquires an image associated with focal position information from the inspection device 40 or the observation device 50.

In addition, the learning image acquisition unit 21 acquires in-focus position information related to the focal position when in focus corresponding to each learning image to be acquired. The in-focus position information is, for example, information indicating the focal position when in focus. However, the in-focus position information is information regarding the focal position when in focus, and may be any information other than the above as long as the information can be used to generate the learned model described above. The in-focus position information is obtained by using a conventional method of measuring the focal position when in focus. For example, the learning image acquisition unit 21 acquires in-focus position information by receiving the user's operation to input the in-focus position information obtained by measurement to the computer 10.

The learning image acquisition unit 21 outputs the acquired information to the feature quantity output model generation unit 22 and the focal position estimation model generation unit 23.

The feature quantity output model generation unit 22 is a feature quantity output model generation means for generating a feature quantity output model by machine learning from the learning image 71 acquired by the learning image acquisition unit 21. The feature quantity output model generation unit 22 compares the feature quantities of two different learning images 71 according to the focal position information associated with the two different learning images 71, and performs machine learning based on the comparison result. The feature quantity output model generation unit 22 may perform machine learning so that the difference between the feature quantities of two different learning images 71 becomes smaller when the two different learning images have the same focal position and the difference between the feature quantities of two different learning images 71 becomes larger when the two different learning images 71 have different focal positions.

The feature quantity output model generation unit 22 generates a feature quantity output model as follows. The feature quantity output model generation unit 22 receives the learning image 71 and the focal position information related to the learning image 71 from the learning image acquisition unit 21. The feature quantity output model generation unit 22 performs machine learning for feature quantity output model generation by using the two learning images 71 selected from the plurality of input learning images 71 as one set. Sets used for machine learning include both a set of learning images 71 related to the same focal position and a set of learning images 71 related to different focal positions. For example, the set of learning images 71 related to the same focal position may be the learning images 71 cut out from the same image 70 as shown in FIG. 4. The set of learning images 71 may be selected by using a method set in advance to satisfy the conditions described above. In addition, the set of learning images 71 may be selected from the images 70 having the same position (XY) at the time of imaging other than the imaging direction (Z-axis direction).

The feature quantity output model generation unit 22 performs machine learning by using information based on the selected set of learning images 71 as an input to the feature quantity output model. As shown in FIG. 4, when one set of learning images 71 each is input to a feature quantity output model 80, a feature quantity for each of the learning images 71 is obtained as an output. In FIG. 4, the value of each element of the vector, which is a feature quantity, is shown in a bar graph. At this time, the feature quantity output model 80 to which one learning image 71 is input is set as a learning target, and the feature quantity output model 80 to which the other learning image 71 is input is set as a comparison target. However, these feature quantity output models 80 are the same during learning.

The feature quantity output model generation unit 22 compares the two output feature quantities with reference to the focal position information, and performs machine learning based on the comparison result. When the focal positions of the two learning images 71 indicated by the focal position information are the same focal position (that is, when the focal positions of the two learning images 71 indicated by the focal position information are on the same plane), the feature quantity output model generation unit 22 performs machine learning so that the difference between the feature quantities of the two learning images 71 becomes smaller. When the focal positions of the two learning images 71 indicated by the focal position information are different focal positions (that is, when the Z positions are different), the feature quantity output model generation unit 22 performs machine learning so that the difference between the feature quantities of the two learning images 71 becomes larger. In addition, in the case of two learning images 71 cut out from the same image, the focal positions of the two learning images 71 are the same focal position. In addition, even when the focal positions of the two learning images 71 are close enough to be regarded as the same, the focal positions of the two learning images 71 may be regarded as the same focal position.

That is, the correlation between the feature quantities of the partial images cut out from the images on the same focal plane becomes large regardless of the cutout position. On the other hand, the correlation between the feature quantities of the partial images cut out from the images on different focal planes becomes small. By performing machine learning in this manner, the feature quantity output from the feature quantity output model reflects the feature corresponding to the focal position.

Specifically, when the focal positions of the two learning images 71 are the same focal position, the feature quantity output model generation unit 22 performs machine learning by using the following loss_xy as a loss function.

$$\text{error}_i = \left(\frac{F_{ti} - F_{ci}}{SD_i}\right)^2 \quad \text{[Equation 1]}$$

$$\text{loss\_xy} = \sqrt{\frac{\sum_{i=0}^{n} \text{error}_i}{n+1}}$$

Here, i (0 to n) is a suffix (subscript) indicating an element of the vector of feature quantities. The number of channels (the number of dimensions) of the vector of feature quantities is n+1. $F_{t0}$ to $F_{tn}$ are the values of the respective elements of the vector of feature quantities output from the feature quantity output model 80 to be learned. $F_{c0}$ to $F_{cn}$ are the values of the respective elements of the vector of feature quantities output from the feature quantity output model 80 to be compared. $SD_i$ is a standard deviation for the element i of each feature quantity. By calculating $\text{error}_i$ by dividing the difference by the standard deviation as described above, variations in the difference for each channel are evened out. Loss is the average (positive square root of the average) of the error for each channel.

When the focal positions of the two learning images 71 are different, the feature quantity output model generation unit 22 performs machine learning by using the following loss_z as a loss function.

$$\text{loss\_z} = \frac{1}{\text{loss\_xy}} \quad \text{[Equation 2]}$$

That is, the loss function in this case is the reciprocal of the loss function when the focal positions of the two learning images 71 are the same focal position. The machine learning itself based on the loss function, that is, the updating of the parameters of the feature quantity output model may be performed in the same manner as in the related art. In addition, the loss function does not necessarily have to be the one described above, and any loss function may be used as long as the loss function conforms to the criteria described above.

The feature quantity output model generation unit 22 generates a feature quantity output model by repeatedly performing selection of a set of learning images 71 and machine learning. For example, the feature quantity output model generation unit 22 generates a feature quantity output model by performing the above repetition until the generation of the feature quantity output model converges based on the conditions set in advance as in the related art or by performing the above repetition a predetermined number of times.

Figure 5:
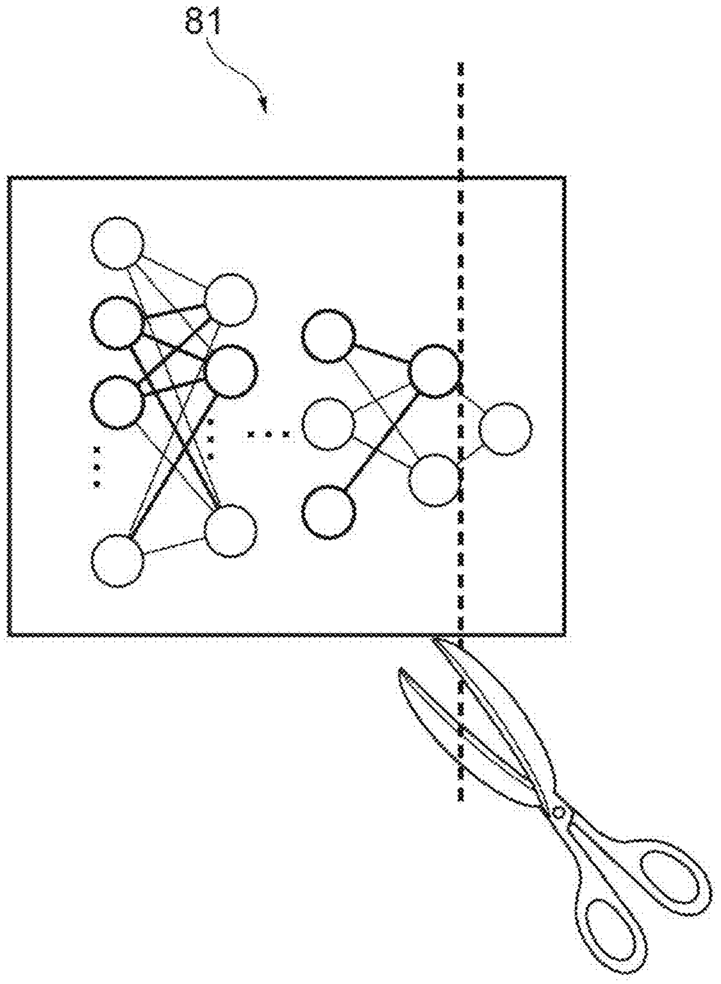
FIG. 5 is a diagram showing an existing learned model used for generating a feature quantity output model.

The feature quantity output model generation unit 22 may generate the feature quantity output model by using an existing learned model generated by machine learning. As the existing learned model, a model to which image-based information is input similarly to the feature quantity output model according to the present embodiment is used. That is, an existing learned model having the same input as the feature quantity output model according to the present embodiment may be used. The existing learned model is, for example, a model for performing image recognition. Specifically, the existing learned model is ResNet, VGG, Mobile Net, and the like. A part of the existing learned model is used to generate the feature quantity output model. As shown in FIG. 5, a layer on the output side of an existing learned model 81 is removed, and a portion up to the intermediate layer of the existing learned model 81 is used to generate the feature quantity output model. The existing learned model 81 used to generate the feature quantity output model may include the entire intermediate layer, or may include only a part of the intermediate layer.

The feature quantity output model generation unit 22 receives the above part of the existing learned model, and uses the part as a feature quantity output model at the start of machine learning. That is, the feature quantity output model generation unit 22 performs fine tuning by using the above part of the existing learned model as an initial parameter of the feature quantity output model. In addition, one obtained by adding a new output layer to the output side of the above part of the learned model may be used as a feature quantity output model at the start of machine learning. In addition, when adding a new output layer, one obtained by adding a new intermediate layer between the output side of the above part of the learned model and the new output layer may be used as a feature quantity output model at the start of machine learning.

In addition, the feature quantity output model generation unit 22 may generate the feature quantity output model without using an existing learned model. For example, a model using random values as initial parameters as in conventional machine learning may be used as a feature quantity output model at the start of machine learning.

Using the existing learned model for the generation of a feature quantity output model has the following advantages. Learning time can be greatly shortened. It is possible to generate a highly accurate feature quantity output model, that is, a feature quantity output model capable of outputting a more appropriate feature quantity even with a small number of learning images 71. The existing learned model described above already has the ability to separate low-abstract features. Therefore, only learning focusing on features with a high degree of abstraction using the new learning image 71 is required.

The feature quantity output model generation unit 22 outputs the generated feature quantity output model to the focal position estimation model generation unit 23 and the focal position estimation system 30. In addition, the generated feature quantity output model may be used for purposes other than those in the present embodiment. In this case, for example, the feature quantity output model generation unit 22 transmits or outputs the feature quantity output model to another device or module that uses the feature quantity output model. Alternatively, the feature quantity output model generation unit 22 may store the generated feature quantity output model in the computer 10 or other devices so that the feature quantity output model can be used by other devices or modules that use the feature quantity output model.

The focal position estimation model generation unit 23 is a focal position estimation model generation means for generating a focal position estimation model by machine learning from the in-focus position information acquired by the learning image acquisition unit 21. The focal position estimation model receives the feature quantity, which is output from the feature quantity output model generated by the feature quantity output model generation unit 22 as described above, as its input and estimates a focal position when in focus corresponding to the image related to the feature quantity.

The focal position estimation model generation unit 23 generates a focal position estimation model as follows. The focal position estimation model generation unit 23 receives the learning image 71 and the in-focus position information related to the learning image 71 from the learning image acquisition unit 21. The focal position estimation model generation unit 23 receives the feature quantity output model from the feature quantity output model generation unit 22.

The focal position estimation model generation unit 23 inputs information based on the learning image 71 to the feature quantity output model, and acquires the feature quantity of the learning image 71 that is an output from the feature quantity output model. The focal position estimation model generation unit 23 performs machine learning with the acquired feature quantity as an input to the focal position estimation model and the information based on the in-focus position information of the learning image 71 related to the input feature quantity as an output of the focal position estimation model. The information based on the in-focus position information is information corresponding to the output of the focal position estimation model. When the focal position estimation model outputs a value for each candidate as described above, the information based on the in-focus position information is, for example, a value (one-hot vector) for each candidate with the value of a candidate corresponding to the in-focus position information being set to 1 and the value of a candidate not corresponding to the in-focus position information being set to 0. When the focal position estimation model outputs the above-described difference or the value of the focal position itself, the information based on the in-focus position information is the in-focus position information itself or the value calculated from the in-focus position information. The focal position estimation model generation unit 23 generates information based on in-focus position information corresponding to the output of the focal position estimation model before performing machine learning.

The machine learning itself, that is, the updating of the parameters of the focal position estimation model may be performed in the same manner as in the related art. The focal position estimation model generation unit 23 generates a focal position estimation model by repeating the machine learning process until the generation of the focal position estimation model converges based on the conditions set in advance as in the related art or by repeating the machine learning process a predetermined number of times.

The focal position estimation model generation unit 23 outputs the generated focal position estimation model to the focal position estimation system 30. In addition, the generated focal position estimation model may be used for purposes other than those in the present embodiment. In this case, for example, the focal position estimation model generation unit 23 transmits or outputs the focal position estimation model to another device or module that uses the focal position estimation model. Alternatively, the focal position estimation model generation unit 23 may store the generated focal position estimation model in the computer 10 or other devices so that the focal position estimation model can be used by other devices or modules that use the focal position estimation model. Up to now, the functions of the feature quantity output model generation system 20 have been described.

Subsequently, the functions of the focal position estimation system 30 according to the present embodiment will be described. As shown in FIG. 1, the focal position estimation system 30 includes an estimation target image acquisition unit 31, a focal position estimation unit 32, and a control unit 33.

Figure 6:
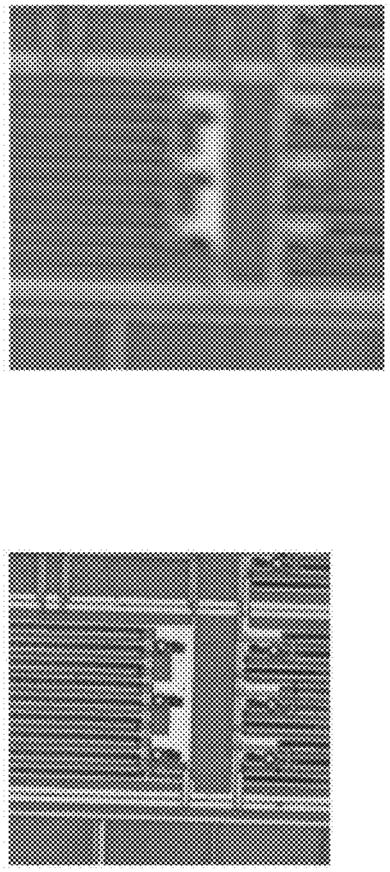
FIG. 6 is a diagram showing examples of a defocused image and a focused image.

The focal position estimation system 30 estimates a focal position when in focus when an imaging target is imaged by the inspection device 40 or the observation device 50. For this estimation, first, imaging (imaging for focusing) of the imaging target is performed by the inspection device 40 or the observation device 50. In this imaging, the focal position does not necessarily have to be a focal point on the imaging target, that is, a focal position when in focus. Therefore, the image obtained by this imaging may be a defocused image. For example, this image may be a defocused image as shown in FIG. 6(*a*). FIG. 6 is an image of a semiconductor device. The defocused image shown in FIG. 6(*a*) is an image when the focal position at the time of imaging is +5 nm from the focal position when in focus.

The focal position estimation system 30 estimates a focal position when in focus from this image. An image in which the imaging target is in focus, that is, a focused image can be obtained by performing imaging in the inspection device 40 or the observation device 50 using the estimated focal position when in focus. For example, a focused image shown in FIG. 6(*b*) is obtained. A focused image shown in FIG. 6(*b*) corresponds to the defocused image shown in FIG. 6(*a*).

The estimation target image acquisition unit 31 is an estimation target image acquisition means for acquiring an estimation target image. The estimation target image is an image used for estimating the focal position when in focus in the focal position estimation system 30. In addition, the estimation target image is an image used for an input to the feature quantity output model. That is, the estimation target image corresponds to the learning image 71 described above.

The estimation target image acquisition unit 31 acquires an image captured by the inspection device 40 or the observation device 50. The imaging by the inspection device 40 or the observation device 50 at this time is the above-described imaging for focusing. For example, the estimation target image acquisition unit 31 cuts out a partial image from the acquired image and acquires the partial image as an estimation target image.

The estimation target image acquisition unit 31 cuts out an estimation target image, which is a partial image having a size set in advance and is used for the input of the feature quantity output model, from the acquired image. The position where the estimation target image is cut out in the image is a portion in which the imaging target is captured. The position where the estimation target image is cut out in the image may be set in advance. Alternatively, a position where it is estimated that the imaging target is captured by performing image recognition on the image may be the position where the estimation target image is cut out.

When the image used for an input to the feature quantity output model has the size of the image captured by the inspection device 40 or the observation device 50, the estimation target image acquisition unit 31 may set the image itself captured by the inspection device 40 or the observation device 50 as an estimation target image.

In addition, the type of the estimation target image is the same type as the learning image described above. For example, the estimation target image may be an image obtained by detecting radiation from the imaging target, an image obtained by detecting light from the imaging target when the imaging target is irradiated with light, or an image obtained by detecting the electrical characteristics of the imaging target when the imaging target is irradiated with light. In addition, the estimation target image may be an image obtained by irradiating the imaging target with light having a specific wavelength.

The estimation target image acquisition unit 31 outputs the acquired estimation target image to the focal position estimation unit 32.

The focal position estimation unit 32 is a focal position estimation means for outputting the feature quantity of the estimation target image from the estimation target image acquired by the estimation target image acquisition unit 31 by using the feature quantity output model and estimating the focal position when in focus corresponding to the estimation target image from the output feature quantity. The focal position estimation unit 32 may estimate the focal position when in focus corresponding to the estimation target image from the feature quantity output from the feature quantity output model by using the focal position estimation model.

The focal position estimation unit 32 receives and stores the focal position estimation model and the feature quantity output model generated by the feature quantity output model generation system 20, and uses these for estimation. The focal position estimation unit 32 receives the estimation target image from the estimation target image acquisition unit 31.

The focal position estimation unit 32 inputs information based on the estimation target image to the feature quantity output model, and acquires the feature quantity of the estimation target image that is an output from the feature quantity output model. The focal position estimation unit 32 inputs the acquired feature quantity to the focal position estimation model, and acquires information indicating the focal position when in focus corresponding to the estimation target image, which is an output from the focal position estimation model, as an estimation result of the focal position. The focal position estimation unit 32 outputs to the control unit 33 the acquired information indicating the focal position when in focus corresponding to the estimation target image.

The control unit 33 is a control means for controlling the focal position when imaging the imaging target based on the focal position estimated by the focal position estimation unit 32. The control unit 33 receives, from the focal position estimation unit 32, the information indicating the focal position when in focus corresponding to the estimation target image. The control unit 33 controls the inspection device 40 or the observation device 50 so that the focal position during imaging becomes the focal position when in focus indicated by the input information. The inspection device 40 or the observation device 50 that has received the control adjusts the focal position during imaging by operating the stage 46, for example. As a result, the image captured by the inspection device 40 or the observation device 50 becomes a focused image. In this manner, the control unit 33 performs autofocus control in the inspection device 40 or the observation device 50. Up to now, the configuration of the focal position estimation system 30 has been described.

Figure 7:
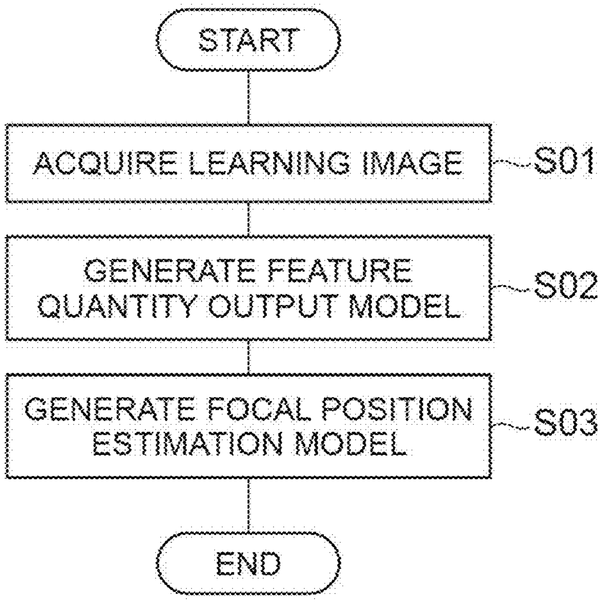
FIG. 7 is a flowchart showing a feature quantity output model generation method, which is a process performed by the feature quantity output model generation system according to the embodiment of the present invention.
Figure 8:
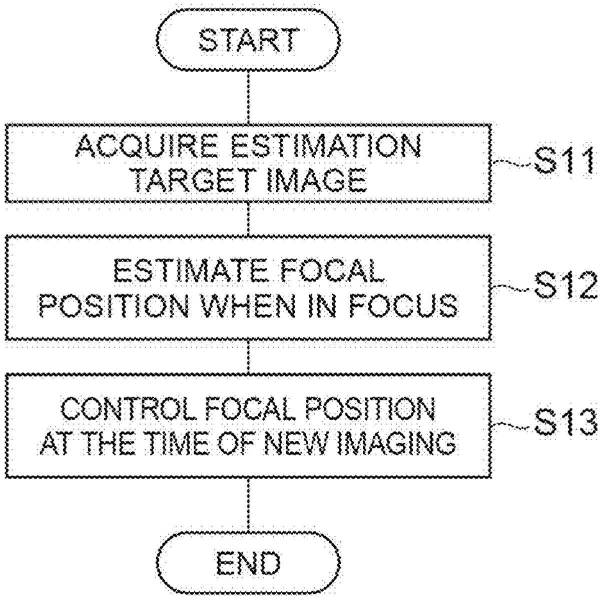
FIG. 8 is a flowchart showing a focal position estimation method, which is a process performed by the focal position estimation system according to the embodiment of the present invention.

Subsequently, a process executed by the computer 10 according to the present embodiment (operation method executed by the computer 10) will be described with reference to flowcharts of FIGS. 7 and 8. First, a feature quantity output model generation method that is a process performed when generating the feature quantity output model and the focal position estimation model, that is, a process performed by the feature quantity output model generation system 20 according to the present embodiment, will be described with reference to the flowchart of FIG. 7.

In this process, first, the learning image acquisition unit 21 acquires a plurality of learning images associated with focal position information related to the focal position at the time of imaging (S01, learning image acquisition step). In addition, the learning image acquisition unit 21 acquires in-focus position information related to the focal position when in focus corresponding to each learning image. Then, the feature quantity output model generation unit 22 generates a feature quantity output model from the learning image by machine learning (S02, feature quantity output model generation step). At this time, the feature quantities of two different learning images 71 are compared with each other according to the focal position information associated with the two different learning images, and machine learning is performed based on the comparison result. Then, the focal position estimation model generation unit 23 generates a focal position estimation model from the in-focus position information by machine learning (S03, focal position estimation model generation step).

The generated feature quantity output model and focal position estimation model are output from the feature quantity output model generation system 20 to the focal position estimation system 30. In the focal position estimation system 30, the feature quantity output model and the focal position estimation model are stored and used in the following processes. Up to now, the feature quantity output model generation method, which is a process performed by the feature quantity output model generation system 20 according to the present embodiment, has been described.

Subsequently, a focal position estimation method that is a process performed when estimating the focal position when in focus corresponding to the estimation target image, that is, a process performed by the focal position estimation system 30 according to the present embodiment, will be described with reference to the flowchart of FIG. 8.

In this process, first, the estimation target image acquisition unit 31 acquires an estimation target image (S11, estimation target image acquisition step). The estimation target image is based on an image obtained by imaging for focusing by the inspection device 40 or the observation device 50. Then, the focal position estimation unit 32 outputs the feature quantity of the estimation target image from the estimation target image by using the feature quantity output model. Then, the focal position estimation unit 32 estimates a focal position when in focus corresponding to the estimation target image from the feature quantity of the estimation target image by using the focal position estimation model (S12, focal position estimation step).

Then, based on the estimated focal position, the control unit 33 controls the focal position when newly imaging the imaging target by the inspection device 40 or the observation device 50 (S13, control step). As a result, the image captured by the inspection device 40 or the observation device 50 becomes a focused image. Up to now, the focal position estimation method, which is a process performed by the focal position estimation system 30 according to the present embodiment, has been described.

In the present embodiment, a feature quantity output model that outputs the feature quantity of an image is generated by machine learning. At this time, the feature quantities of two different learning images are compared with each other according to the focal position information associated with the two different learning images, and machine learning is performed based on the comparison result. According to this generation, it is possible to generate a feature quantity output model in a short time by using, for example, an existing learned model to which image-based information is input. That is, according to the present embodiment, it is possible to generate a feature quantity output model, which is a learned model used for image-based estimation such as focal position estimation, by short-time learning.

However, as described above, it is not always necessary to use an existing learned model to generate the feature quantity output model. Even in this case, it is possible to generate a feature quantity output model capable of outputting an appropriate feature quantity according to the focal position.

In addition, as described above, machine learning for generating the feature quantity output model may be performed so that the difference between the feature quantities of two different learning images becomes smaller when the two different learning images have the same focal position and the difference between the feature quantities of two different learning images becomes larger when the two different learning images have different focal positions. According to this configuration, it is possible to reliably and appropriately generate a feature quantity output model. However, the machine learning does not necessarily have to be performed as described above, and may be performed based on the result of comparing the feature quantities of the two learning images.

In addition, as described above, the learning image and the estimation target image may be images obtained by detecting radiation from the imaging target, images obtained by detecting light from the imaging target when the imaging target is irradiated with light, or images obtained by detecting the electrical characteristics of the imaging target when the imaging target is irradiated with light. In addition, the learning image and the estimation target image may be images obtained when the imaging target is irradiated with light having a specific wavelength. According to these configurations, it is possible to generate an appropriate feature quantity output model according to the type of image to be used and to use the feature quantity output model. However, the learning image and the estimation target image are not limited to those described above, and may be any images corresponding to the focal position.

In addition, as in the present embodiment, the feature quantity output model generation system 20 may further include the focal position estimation model generation unit 23 that generates a focal position estimation model. According to this configuration, it is possible to generate a focal position estimation model for estimating the focal position when in focus from the image. That is, according to this configuration, it is possible to generate a learned model used for estimating the focal position based on the image by short-time learning, together with the feature quantity output model.

However, the feature quantity output model generation system 20 may not include the focal position estimation model generation unit 23. That is, the feature quantity output model generation system 20 may be configured to generate only the feature quantity output model. In addition, the generated feature quantity output model may be used for purposes other than estimating the focal position when in focus.

In the focal position estimation system 30 according to the present embodiment, the feature quantity output model described above is used for estimating the focal position when in focus. Therefore, according to the present embodiment, it is possible to estimate the focal position when in focus based on the image in a short preparation time. In addition, according to the focal position estimation system 30 according to the present embodiment, it is possible to estimate the focal position when in focus by one-time imaging for focusing. For this reason, it is possible to estimate the focal position when in focus more quickly than in the case of searching for the focal position when in focus by performing imaging a plurality of times while changing the focal position.

In addition, the focal position estimation model described above may be used for estimating the focal position when in focus. According to this configuration, it is possible to reliably and appropriately estimate the focal position when in focus. However, it is not necessary to use the focal position estimation model described above for estimating the focal position when in focus, and the focal position when in focus may be estimated from the feature quantity output from the feature quantity output model.

In addition, as in the present embodiment, the focal position estimation system 30 may further include the control unit 33 that controls the focal position when imaging the imaging target in the inspection device 40 or the observation device 50 based on the estimated focal position. According to this configuration, it is possible to image the imaging target that is in focus in the inspection device 40 or the observation device 50. However, the focal position estimation system 30 may not include the control unit 33. That is, the focal position estimation system 30 may be any system that estimates the focal position when in focus.

In addition, a series of systems including the focal position estimation system 30 according to the present embodiment and the inspection device 40 or the observation device 50 described above can be used. That is, a semiconductor inspection system according to the present embodiment may be a system including the focal position estimation system 30 and the inspection device 40. In addition, a biological observation system according to the present embodiment may be a system including the focal position estimation system 30 and the observation device 50.

The estimation of the focal position when in focus by the focal position estimation system 30 may be performed for a plurality of positions of the image captured by the inspection device 40 or the observation device 50. In this case, the estimation target image acquisition unit 31 cuts out and acquires a plurality of estimation target images from each of the plurality of positions of the image captured by the inspection device 40 or the observation device 50. For example, the estimation target image acquisition unit 31 cuts out estimation target images from a plurality of portions of the image in which the imaging target is captured. The focal position estimation unit 32 estimates a focal position when in focus for each of the plurality of estimation target images. For example, the focal position estimation unit 32 may generate a focus map indicating the focal position when in focus for each position. Based on the focal position when in focus for each position, the control unit 33 may control the inspection device 40 or the observation device 50 so that the focal position is adjusted for each position to perform imaging.

Figure 9:
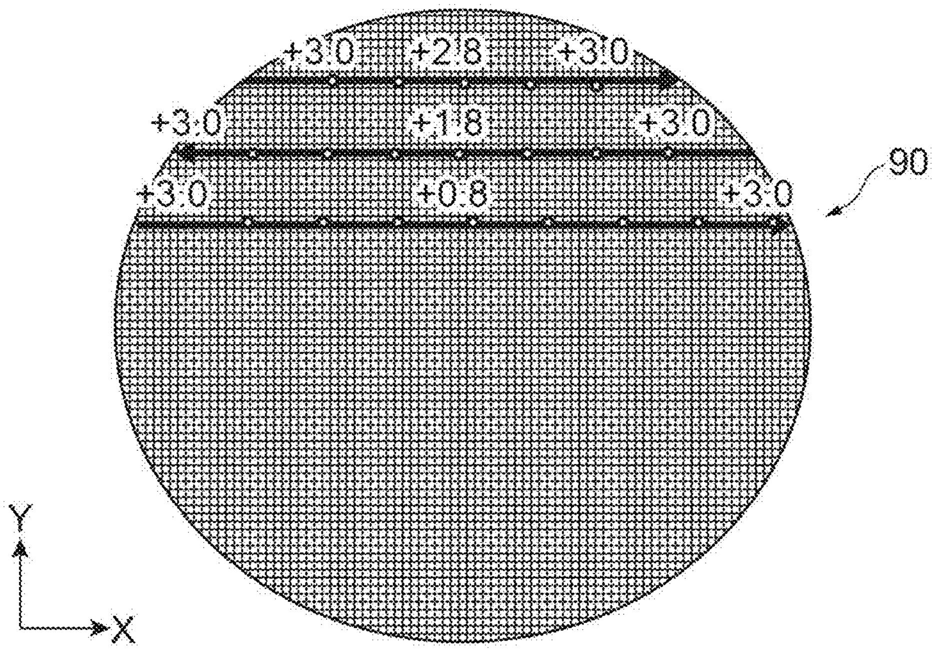
FIG. 9 is a diagram schematically showing a generated focus map.
Figure 9:
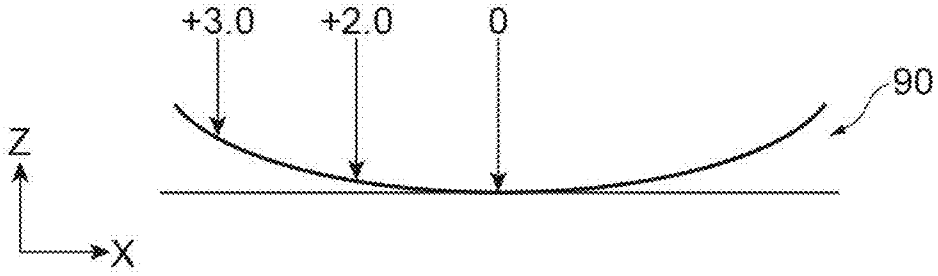

FIG. 9 shows a focal position when in focus (focus map) estimated for each position. FIG. 9(*a*) shows a focal position when in focus for each position of an imaging target 90 on a plane (XY plane) perpendicular to the imaging direction (Z-axis direction). FIG. 9(*b*) shows a focal position when in focus for each position of the imaging target 90 on a plane (XZ plane) when the imaging direction (Z-axis direction) is viewed from the side (Y-axis). Each value in FIG. 9 indicates a difference between a focal position when the estimation target image is captured and a focal position when in focus.

When inspecting a wafer covered with μLEDs, for example, even if focal position alignment is performed at the center of the wafer, blurring occurs in portions near the sides of the wafer. Therefore, by generating the focus map to control as described above, an image that can be appropriately used for inspection can be captured for each position. In addition, even when the imaging target is not the semiconductor device described above, for example, when the imaging target is a biological sample, the configuration described above can be adopted.

In addition, although the computer 10 includes the feature quantity output model generation system 20 and the focal position estimation system 30 in the present embodiment, the feature quantity output model generation system 20 and the focal position estimation system 30 may be implemented independently.

Figure 10:
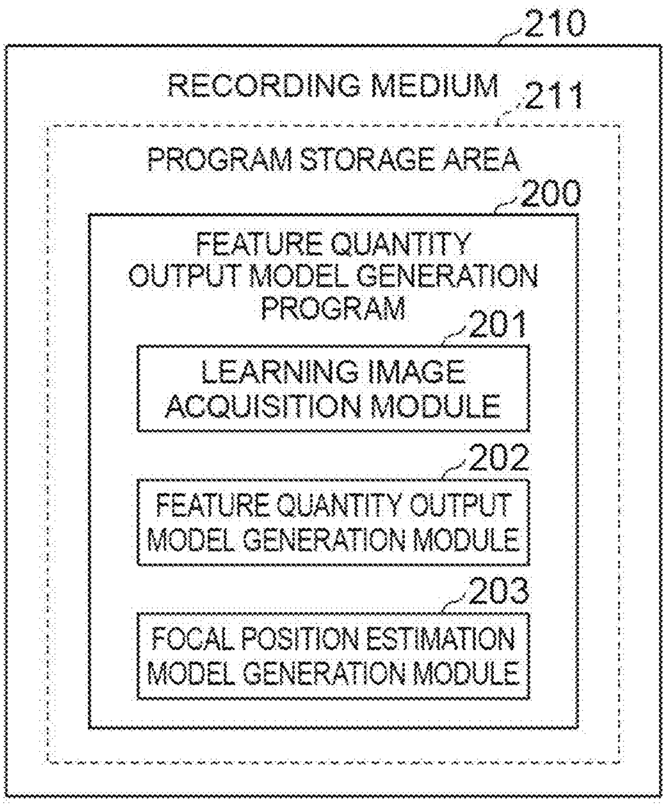
FIG. 10 is a diagram showing the configuration of a feature quantity output model generation program according to an embodiment of the present invention together with a recording medium.

Subsequently, a feature quantity output model generation program and a focal position estimation program for executing the series of processes by the feature quantity output model generation system 20 and the focal position estimation system 30 described above will be described. As shown in FIG. 10, a feature quantity output model generation program 200 is stored in a program storage area 211 formed in a computer-readable recording medium 210 which is inserted into a computer or which is provided in the computer. The recording medium 210 may be a non-transitory recording medium.

The feature quantity output model generation program 200 includes a learning image acquisition module 201, a feature quantity output model generation module 202, and a focal position estimation model generation module 203. The functions realized by executing the learning image acquisition module 201, the feature quantity output model generation module 202, and the focal position estimation model generation module 203 are the same as the functions of the learning image acquisition unit 21, the feature quantity output model generation unit 22, and the focal position estimation model generation unit 23 of the feature quantity output model generation system 20 described above, respectively.

Figure 11:
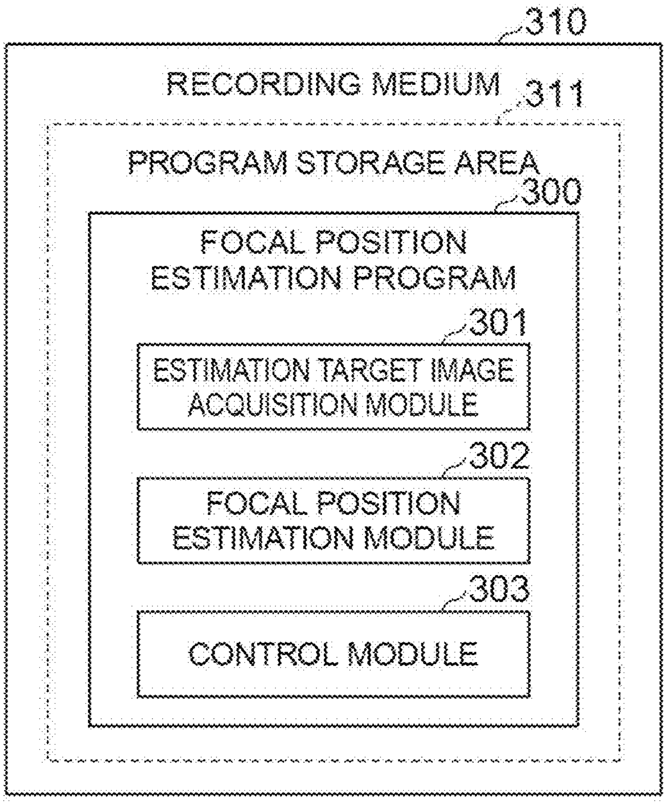
FIG. 11 is a diagram showing the configuration of a focal position estimation program according to an embodiment of the present invention together with a recording medium.

As shown in FIG. 11, a focal position estimation program 300 is stored in a program storage area 311 formed in a computer-readable recording medium 310 which is inserted into a computer or which is provided in the computer. The recording medium 310 may be a non-transitory recording medium. In addition, the recording medium 310 may be the same as the recording medium 210.

The focal position estimation program 300 includes an estimation target image acquisition module 301, a focal position estimation module 302, and a control module 303. The functions realized by executing the focal position estimation module 302 and the control module 303 are the same as the functions of the estimation target image acquisition unit 31, the focal position estimation unit 32, and the control unit 33 of the focal position estimation system 30 described above, respectively.

In addition, a part or entirety of each of the feature quantity output model generation program 200 and the focal position estimation program 300 may be transmitted through a transmission medium, such as a communication line, and received by another device and recorded (including installation). In addition, each module of the feature quantity output model generation program 200 and the focal position estimation program 300 may be installed in any of a plurality of computers instead of one computer. In this case, the above-described series of processes are performed by a computer system including the plurality of computers.

REFERENCE SIGNS LIST

10: computer, 20: feature quantity output model generation system, 21: learning image acquisition unit, 22:

feature quantity output model generation unit, 23: focal position estimation model generation unit, 30: focal position estimation system, 31: estimation target image acquisition unit, 32: focal position estimation unit, 33: control unit, 40: inspection device, 41: camera, 42: mounting unit, 43: light source, 44: optical system, 45: objective lens, 46: stage, 50: observation device, 200: feature quantity output model generation program, 201: learning image acquisition module, 202: feature quantity output model generation module, 203: focal position estimation model generation module, 210: recording medium, 211: program storage area, 300: focal position estimation program, 301: estimation target image acquisition module, 302: focal position estimation module, 303: control module, 310: recording medium, 311: program storage area.

The invention claimed is:

1. A feature quantity output model generation system for generating a feature quantity output model to which information based on an image is input and which outputs a feature quantity of the image, comprising circuitry configured to:

acquire a plurality of learning images associated with focal position information related to a focal position at the time of imaging; and generate a feature quantity output model by machine learning from the acquired learning images, wherein the circuitry compares feature quantities of two different learning images according to focal position information associated with the two different learning images and performs machine learning based on a result of the comparison, and wherein the circuitry performs machine learning so that a difference between feature quantities of two different learning images becomes smaller when the two different learning images have the same focal position and the difference between the feature quantities of the two different learning images becomes larger when the two different learning images have different focal positions.

2. The feature quantity output model generation system according to claim 1, wherein the circuitry acquires, as a learning image, an image obtained by detecting radiation from an imaging target, an image obtained by detecting light from the imaging target when the imaging target is irradiated with light, or an image obtained by detecting electrical characteristics of the imaging target when the imaging target is irradiated with light.

3. The feature quantity output model generation system according to claim 2, wherein the circuitry acquires, as a learning image, an image obtained by irradiating the imaging target with light having a specific wavelength.

4. The feature quantity output model generation system according to claim 1, wherein the circuitry acquires in-focus position information related to a focal position when in focus corresponding to each learning image to be acquired, and the circuitry generates a focal position estimation model to which a feature quantity output from the generated feature quantity output model is input, and which estimates a focal position when in focus corresponding to an image related to the feature quantity, by machine learning from the acquired in-focus position information acquired by the learning image acquisition means.

5. A feature quantity output model generation method for generating a feature quantity output model to which information based on an image is input and which outputs a feature quantity of the image, comprising:

acquiring a plurality of learning images associated with focal position information related to a focal position at the time of imaging; and generating a feature quantity output model by machine learning from the acquired learning images, wherein, feature quantities of two different learning images are compared with each other according to focal position information associated with the two different learning images, and machine learning is performed based on a result of the comparison, and wherein, machine learning is performed so that a difference between feature quantities of two different learning images becomes smaller when the two different learning images have the same focal position and the difference between the feature quantities of the two different learning images becomes larger when the two different learning images have different focal positions.

6. The feature quantity output model generation method according to claim 5, wherein, an image obtained by detecting radiation from an imaging target, an image obtained by detecting light from the imaging target when the imaging target is irradiated with light, or an image obtained by detecting electrical characteristics of the imaging target when the imaging target is irradiated with light is acquired as a learning image.

7. The feature quantity output model generation method according to claim 6, wherein, an image obtained by irradiating the imaging target with light having a specific wavelength is acquired as a learning image.

8. The feature quantity output model generation method according to claim 5, wherein, in-focus position information related to a focal position when in focus corresponding to each learning image to be acquired is acquired, and the feature quantity output model generation method further includes generating a focal position estimation model to which a feature quantity output from the generated feature quantity output model is input, and which estimates a focal position when in focus corresponding to an image related to the feature quantity, by machine learning from the acquired in-focus position information.

9. A non-transitory computer-readable storage medium storing a feature quantity output model generation program causing a computer to operate as a feature quantity output model generation system for generating a feature quantity output model to which information based on an image is input and which outputs a feature quantity of the image, the feature quantity output model generation program causing the computer to acquire a plurality of learning images associated with focal position information related to a focal position at the time of imaging; and generate a feature quantity output model by machine learning from the acquired learning images, wherein the feature quantity output model generation program causes the computer to compare feature quantities of two different learning images according to focal position information associated with the two different learning images and perform machine learning based on a result of the comparison, and wherein the feature quantity output model generation program causes the computer to perform machine learning so that a difference between feature quantities of two different learning images becomes smaller when the two different learning images have the same focal position and the difference between the feature quantities of the two different learning images becomes larger when the two different learning images have different focal positions.

10. The non-transitory computer-readable storage medium according to claim 9, wherein the feature quantity output model generation program causes the computer to acquire, as a learning image, an image obtained by detecting radiation from an imaging target, an image obtained by detecting light from the imaging target when the imaging target is irradiated with light, or an image obtained by detecting electrical characteristics of the imaging target when the imaging target is irradiated with light.

11. The non-transitory computer-readable storage medium according to claim 10, wherein the feature quantity output model generation program causes the computer to acquire, as a learning image, an image obtained by irradiating the imaging target with light having a specific wavelength.

12. The non-transitory computer-readable storage medium according to claim 9, wherein the feature quantity output model generation program causes the computer to acquire in-focus position information related to a focal position when in focus corresponding to each learning image to be acquired, and generate a focal position estimation model to which a feature quantity output from the generated feature quantity output model is input, and which estimates a focal position when in focus corresponding to an image related to the feature quantity, by machine learning from the acquired in-focus position information.

* * * * *